United States Patent
Li

(10) Patent No.: US 11,216,997 B2
(45) Date of Patent: Jan. 4, 2022

(54) METHOD AND APPARATUS FOR DISPLAYING HISTORICAL CHAT RECORD

(71) Applicant: Huawei Technologies Co., Ltd., Shenzhen (CN)

(72) Inventor: Zijun Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 21 days.

(21) Appl. No.: 15/547,592

(22) PCT Filed: Jan. 29, 2015

(86) PCT No.: PCT/CN2015/071822
§ 371 (c)(1),
(2) Date: Jul. 31, 2017

(87) PCT Pub. No.: WO2016/119165
PCT Pub. Date: Aug. 4, 2016

(65) Prior Publication Data
US 2018/0018798 A1    Jan. 18, 2018

(51) Int. Cl.
*G06T 11/60* (2006.01)
*H04L 12/58* (2006.01)

(52) U.S. Cl.
CPC .............. *G06T 11/60* (2013.01); *H04L 51/04* (2013.01); *H04L 51/16* (2013.01)

(58) Field of Classification Search
CPC ......... G06T 11/60; H04L 51/04; H04L 51/16; H04L 12/1813; H04L 51/00; H04L 51/066; G06F 16/90332; G06F 16/904; G06F 16/90328; G06F 16/9038; G06F 7/08; G06F 7/14; G06F 7/16; G06F 17/32
See application file for complete search history.

(56) References Cited

U.S. PATENT DOCUMENTS 6,088,719 A    7/2000  Murakami
8,700,074 B2 *  4/2014  Kang ................ H04M 1/72547
                                                 455/466

(Continued)

FOREIGN PATENT DOCUMENTS

CN    101060502 A    10/2007
CN    101227424 A    7/2008

(Continued)

OTHER PUBLICATIONS

Machine Translation and Abstract of Japanese Publication No. JP2005025361, Jan. 27, 2005, 25 pages.

(Continued)

Primary Examiner — Chante E Harrison
(74) Attorney, Agent, or Firm — Conley Rose, P.C.

(57) ABSTRACT

A method and an apparatus for displaying a historical chat record, and an electronic device includes determining a to-be-displayed chat record; obtaining display manner control information, where the display manner control information is generated based on attribute information of the to-be-displayed chat record; and displaying the to-be-displayed chat record in a display manner specified by the display manner control information, thereby displaying different to-be-displayed chat records in different display manners.

22 Claims, 5 Drawing Sheets

(56) References Cited

U.S. PATENT DOCUMENTS

| | | | |
|---|---|---|---|
| 2008/0250107 A1* | 10/2008 | Holzer | H04L 12/1831 709/206 |
| 2009/0248751 A1* | 10/2009 | Myman | G06Q 10/107 |
| 2010/0267369 A1* | 10/2010 | Lim | H04L 12/1822 455/414.1 |
| 2013/0226943 A1 | 8/2013 | Zheng et al. | |
| 2014/0143230 A1* | 5/2014 | Scherpa | H04L 51/04 707/722 |
| 2014/0181697 A1* | 6/2014 | Kirigin | G06F 3/048 715/758 |
| 2015/0012881 A1* | 1/2015 | Song | G06F 3/04842 715/803 |
| 2015/0074555 A1* | 3/2015 | Yoon | G06F 3/04817 715/753 |
| 2015/0261389 A1* | 9/2015 | Abate | G06F 3/0481 715/741 |
| 2015/0263996 A1* | 9/2015 | Abate | H04L 51/04 715/753 |
| 2015/0281142 A1* | 10/2015 | Chen | H04L 51/04 709/206 |
| 2015/0309720 A1* | 10/2015 | Fisher | G06F 3/04842 715/752 |
| 2016/0277327 A1* | 9/2016 | Zha | G06Q 10/107 |
| 2016/0301640 A1* | 10/2016 | Zhang | H04L 51/10 |
| 2016/0373386 A1* | 12/2016 | Wang | G06F 17/2705 |
| 2017/0132019 A1* | 5/2017 | Karashchuk | H04W 4/12 |
| 2017/0289085 A1* | 10/2017 | Kim | H04W 4/12 |
| 2018/0351894 A1* | 12/2018 | Onoda | H04L 51/10 |
| 2021/0014180 A1* | 1/2021 | Lee | G06F 9/461 |

FOREIGN PATENT DOCUMENTS

| | | |
|---|---|---|
| CN | 101478732 A | 7/2009 |
| CN | 102447778 A | 5/2012 |
| CN | 102469031 A | 5/2012 |
| CN | 102685154 A | 9/2012 |
| JP | H1196100 A | 4/1999 |
| JP | 2005025361 A | 1/2005 |
| JP | 2007066315 A | 3/2007 |
| JP | 2013046198 A | 3/2013 |
| WO | 2013116848 A2 | 8/2013 |
| WO | 2014206278 A1 | 12/2014 |

OTHER PUBLICATIONS

Machine Translation and Abstract of Japanese Publication No. JP2007066315, Mar. 15, 2007, 20 pages.
Machine Translation and Abstract of Japanese Publication No. JP2013046198, Mar. 4, 2013, 13 pages.
Foreign Communication From A Counterpart Application, Japanese Application No. 2017-540132, Japanese Office Action dated Sep. 3, 2018, 5 pages.
Foreign Communication From A Counterpart Application, Japanese Application No. 2017-540132, English Translation of Japanese Office Action dated Sep. 3, 2018, 7 pages.
Machine Translation and Abstract of Chinese Publication No. CN101227424, Jul. 23, 2008, 10 pages.
Machine Translation and Abstract of Chinese Publication No. CN102469031, May 23, 2012, 7 pages.
Foreign Communication From A Counterpart Application, PCT Application No. PCT/CN2015/071822, English Translation of International Search Report dated May 6, 2015, 2 pages.
Foreign Communication From A Counterpart Application, PCT Application No. PCT/CN2015/071822, English Translation of Written Opinion dated May 6, 2015, 7 pages.
Foreign Communication From A Counterpart Application, European Application No. 15879373.7, Extended European Search Report dated Feb. 14, 2018, 8 pages.
Foreign Communication From A Counterpart Application, Japanese Application No. 2017-540132, Japanese Office Action dated Apr. 15, 2019, 5 pages.
Foreign Communication From A Counterpart Application, Japanese Application No. 2017-540132, English Translation of Japanese Office Action dated Apr. 15, 2019, 6 pages.
Machine Translation and Abstract of Chinese Publication No. CN101060502, Oct. 24, 2007, 12 pages.
Machine Translation and Abstract of Chinese Publication No. CN101478732, Jul. 8, 2009, 15 pages.
Machine Translation and Abstract of Chinese Publication No. CN102685154, Sep. 19, 2012, 14 pages.
Foreign Communication From A Counterpart Application, Chinese Application No. 201580003454 7, Chinese Office Action dated Apr. 29, 2019, 8 pages.

* cited by examiner

METHOD AND APPARATUS FOR DISPLAYING HISTORICAL CHAT RECORD

CROSS-REFERENCE TO RELATED APPLICATIONS

This application is a national stage application of International Patent Application No. PCT/CN2015/071822, filed on Jan. 29, 2015, which is herein incorporated by reference in its entirety.

TECHNICAL FIELD

The disclosure relates to the communications field, and in particular, to a method and an apparatus for displaying a historical chat record.

BACKGROUND

As mobile terminal technology continuously develops, various chat applications also gradually increase, and a mobile terminal user has gradually gotten used to communication by using a chat application. A terminal may display in real time chat information sent by the user, and generate a historical chat record that includes the chat information, so that the user can perform instant chat by using the terminal, and can read a historical chat record generated during a previous chat.

When the user performs instant chat by using the terminal, a display manner in which the terminal displays the chat information varies with a chat topic and a chat participant. For example, the terminal displays, piece by piece at a frequency consistent with a sending frequency of the user, the chat information sent by the user. The terminal also displays the chat information or the like according to one of multiple different display effects that is selected by a user, such as fly-in, horizontal scrolling, or vertical scrolling. The terminal displays the chat information in different display manners, which can reflect scenario information such as chat topic popularity or user enthusiasm for chat participation, and make a process in which the user chats by using the terminal more vivid.

However, when the user reads the historical chat record, the terminal displays the historical chat record in a same display manner regardless of a type of chat information included in the historical chat record. The terminal displays, in chronological order, all pieces of chat information included in the historical chat record regardless of a quantity of pieces of chat information included in the historical chat record. If the historical chat record includes a relatively small quantity of pieces of chat information, the terminal displays all the chat information on a screen at a time; if the historical chat record includes a relatively large quantity of pieces of chat information, a part of the chat information is first displayed on a screen, and when it is detected that the user performs a scrolling action, another part of the chat information that is connected to the displayed part of the chat information is then displayed on the screen.

It can be seen that, by using an existing method for displaying a historical chat record, the terminal displays the historical chat record in a same display manner regardless of a type of chat information included in the historical chat record, thereby causing a problem that a display manner of the historical chat record is undiversified.

SUMMARY

Embodiments of the disclosure provide a method and an apparatus for displaying a historical chat record, so as to resolve a problem in prior art that a display manner of a historical chat record is undiversified.

According to a first aspect, an embodiment of the disclosure provides a method for displaying a historical chat record, including determining a to-be-displayed chat record; obtaining display manner control information, where the display manner control information is generated based on attribute information of the to-be-displayed chat record; and displaying the to-be-displayed chat record in a display manner specified by the display manner control information.

With reference to the first aspect, in a first possible implementation manner of the first aspect, the obtaining display manner control information includes obtaining the attribute information of the to-be-displayed chat record; and generating the display manner control information according to the attribute information of the to-be-displayed chat record.

With reference to the first possible implementation manner of the first aspect, in a second possible implementation manner of the first aspect, the generating the display manner control information according to the attribute information of the to-be-displayed chat record includes when the to-be-displayed chat record includes a first content unit and a second content unit, setting a display time interval between a display start moment of the first content unit and a display start moment of the second content unit; and generating the display manner control information that includes the display time interval, and displaying the to-be-displayed chat record in a display manner specified by the display manner control information includes successively displaying the first content unit and the second content unit according to the display time interval.

With reference to the second possible implementation manner of the first aspect, in a third possible implementation manner of the first aspect, setting a display time interval between a display start moment of the first content unit and a display start moment of the second content unit includes obtaining a generation time interval between a generation moment of the first content unit and a generation moment of the second content unit; and when the generation time interval is greater than or equal to a first threshold, setting the display time interval to a first interval value; or when the generation time interval is less than a first threshold and is greater than a second threshold, setting the display time interval to a second interval value; or when the generation time interval is less than or equal to a second threshold, setting the display time interval to a third interval value, where the first threshold is greater than the second threshold, the first interval value is greater than the second interval value, and the second interval value is greater than the third interval value.

With reference to the first possible implementation manner of the first aspect, in a fourth possible implementation manner of the first aspect, generating the display manner control information according to the attribute information of the to-be-displayed chat record includes setting display effect control information of a specified content unit according to attribute information of the specified content unit in the to-be-displayed chat record; and generating the display manner control information that includes the display effect control information; and displaying the to-be-displayed chat record in a display manner specified by the display manner control information includes displaying the specified content unit by using a display effect corresponding to the display effect control information.

With reference to the fourth possible implementation manner of the first aspect, in a fifth possible implementation manner of the first aspect, when the attribute information of the specified content unit is a content sender of a content unit, setting display effect control information of a specified content unit according to attribute information of the specified content unit in the to-be-displayed chat record includes setting the display effect control information of the specified content unit as first preset display effect control information corresponding to a content sender of the specified content unit.

With reference to the fourth possible implementation manner of the first aspect, in a sixth possible implementation manner of the first aspect, when the attribute information of the specified content unit is a semantic feature included in a content unit, setting display effect control information of a specified content unit according to attribute information of the specified content unit in the to-be-displayed chat record includes setting the display effect control information of the specified content unit as second preset display effect control information corresponding to a semantic feature included in the specified content unit.

With reference to the fourth possible implementation manner of the first aspect, in a seventh possible implementation manner of the first aspect, when the attribute information of the specified content unit is a user state of a content sender, setting display effect control information of a specified content unit according to attribute information of the specified content unit in the to-be-displayed chat record includes setting the display effect control information of the specified content unit as third preset display effect control information corresponding to a first specified user state, where the first specified user state is a user state of a content sender of the specified content unit when the content unit is generated, or setting the display effect control information of the specified content unit as fourth preset display effect control information corresponding to a second specified user state, where the second specified user state is a user state of a content sender of the specified content unit when a historical chat record is displayed.

With reference to the first aspect, in an eighth possible implementation manner of the first aspect, the obtaining display manner control information includes receiving the display manner control information that is generated based on the attribute information of the to-be-displayed chat record and sent by a control information generation device.

With reference to the eighth possible implementation manner of the first aspect, in a ninth possible implementation manner of the first aspect, receiving the display manner control information that is generated based on the attribute information of the to-be-displayed chat record and sent by a control information generation device includes, when the to-be-displayed chat record includes a first content unit and a second content unit, receiving the display manner control information that is generated and sent by the control information generation device, where the display manner control information includes a display time interval; and displaying the to-be-displayed chat record in a display manner specified by the display manner control information includes successively displaying the first content unit and the second content unit according to the display time interval.

With reference to the eighth possible implementation manner of the first aspect, in a tenth possible implementation manner of the first aspect, receiving the display manner control information that is generated based on the attribute information of the to-be-displayed chat record and sent by a control information generation device includes receiving the display manner control information that is generated and sent by the control information generation device, where the display manner control information includes display effect control information of a specified content unit; and displaying the to-be-displayed chat record in a display manner specified by the display manner control information includes displaying the specified content unit by using a display effect corresponding to the display effect control information.

With reference to the first aspect or any one of the first to the tenth possible implementation manners of the first aspect, in an eleventh possible implementation manner of the first aspect, determining a to-be-displayed chat record includes obtaining an original historical chat record that meets a pre-determined screening condition, searching for association information associated with attribute information of the original historical chat record, and generating the to-be-displayed chat record that includes the original historical chat record and the association information.

With reference to the first aspect or any one of the first to the eleventh possible implementation manners of the first aspect, displaying the to-be-displayed chat record in a display manner specified by the display manner control information includes obtaining a script by combining the display manner control information with the display chat record; and running the script.

According to a second aspect, an embodiment of the disclosure provides an apparatus for displaying a historical chat record, including a determining unit configured to determine a to-be-displayed chat record; an obtaining unit configured to obtain display manner control information, where the display manner control information is generated based on attribute information of the to-be-displayed chat record; and a display unit configured to display the to-be-displayed chat record in a display manner specified by the display manner control information.

With reference to the second aspect, in a first possible implementation manner of the second aspect, the obtaining unit includes an obtaining subunit configured to obtain the attribute information of the to-be-displayed chat record; and a generation subunit configured to generate the display manner control information according to the attribute information of the to-be-displayed chat record.

With reference to the first possible implementation manner of the second aspect, in a second possible implementation manner of the second aspect, the generation subunit includes a time interval setting subunit configured to, when the to-be-displayed chat record includes a first content unit and a second content unit, set a display time interval between a display start moment of the first content unit and a display start moment of the second content unit, and a first control information generation subunit configured to generate the display manner control information that includes the display time interval; and the display unit is specifically configured to successively display the first content unit and the second content unit according to the display time interval.

With reference to the second possible implementation manner of the second aspect, in a third possible implementation manner of the second aspect, the time interval setting subunit is specifically configured to, when a generation time interval between a generation moment of the first content unit and a generation moment of the second content unit is greater than or equal to a first threshold, set the display time interval to a first interval value, or when the generation time interval is less than a first threshold and is greater than a second threshold, set the display time interval to a second interval value, or when the generation time interval is less than or equal to a second threshold, set the display time interval to a third interval value, where the first threshold is greater than the second threshold, the first interval value is greater than the second interval value, and the second interval value is greater than the third interval value.

With reference to the first possible implementation manner of the second aspect, in a fourth possible implementation manner of the second aspect, the generation subunit includes a display effect setting subunit configured to set display effect control information of a specified content unit according to attribute information of the specified content unit in the to-be-displayed chat record; and a second control information generation subunit configured to generate the display manner control information that includes the display effect control information; and the display unit is specifically configured to display the specified content unit by using a display effect corresponding to the display effect control information.

With reference to the fourth possible implementation manner of the second aspect, in a fifth possible implementation manner of the second aspect, when the attribute information of the specified content unit is a content sender of a content unit, the second display effect setting subunit is configured to set the display effect control information of the specified content unit as first preset display effect control information corresponding to a content sender of the specified content unit.

With reference to the fourth possible implementation manner of the second aspect, in a sixth possible implementation manner of the second aspect, when the attribute information of the specified content unit is a semantic feature included in a content unit, the second display effect setting subunit is configured to set the display effect control information of the specified content unit as second preset display effect control information corresponding to a semantic feature included in the specified content unit.

With reference to the fourth possible implementation manner of the second aspect, in a seventh possible implementation manner of the second aspect, when the attribute information of the specified content unit is a user state of a content sender, the second display effect setting subunit is configured to set the display effect control information of the specified content unit as third preset display effect control information corresponding to a first specified user state, where the first specified user state is a user state of a content sender of the specified content unit when the content unit is generated; or set the display effect control information of the specified content unit as fourth preset display effect control information corresponding to a second specified user state, where the second specified user state is a user state of a content sender of the specified content unit when a historical chat record is displayed.

With reference to the second aspect, in an eighth possible implementation manner of the second aspect, the obtaining unit is configured to receive the display manner control information that is generated based on the attribute information of the to-be-displayed chat record and sent by a control information generation device.

With reference to the eighth possible implementation manner of the second aspect, in a ninth possible implementation manner of the second aspect, the obtaining unit is configured to, when the to-be-displayed chat record includes a first content unit and a second content unit, receive the display manner control information that is generated and sent by the control information generation device, where the display manner control information includes a display time interval; and the display unit is configured to successively display the first content unit and the second content unit according to the display time interval.

With reference to the eighth possible implementation manner of the second aspect, in a tenth possible implementation manner of the second aspect, the obtaining unit is configured to receive the display manner control information that is generated and sent by the control information generation device, where the display manner control information includes display effect control information of a specified content unit; and the display unit is configured to display the specified content unit by using a display effect corresponding to the display effect control information.

With reference to the second aspect or any one of the first to the tenth possible implementation manners of the second aspect, in an eleventh possible implementation manner of the second aspect, the determining unit includes an original record obtaining subunit configured to obtain an original historical chat record that meets a pre-determined screening condition; an association information search subunit configured to search for association information associated with attribute information of the original historical chat record; and a chat record generation subunit configured to generate the to-be-displayed chat record that includes the original historical chat record and the association information.

With reference to the second aspect or any one of the first to the eleventh possible implementation manners of the second aspect, the display unit includes a script combination subunit configured to obtain a script by combining the display manner control information with the display chat record; and a script running subunit configured to run the script.

According to a third aspect, an embodiment of the disclosure provides an electronic device, including a monitor, one or more processors, a memory, multiple application programs, and one or more programs, where the one or more programs are stored in the memory, and are configured for execution by the one or more processors, the one or more programs include an instruction, and the instruction is used to determine a to-be-displayed chat record; obtain display manner control information, where the display manner control information is generated based on attribute information of the to-be-displayed chat record; and display the to-be-displayed chat record in a display manner specified by the display manner control information.

With reference to the third aspect, in a first possible implementation manner of the third aspect, the electronic device further includes one or more programs, where the one or more programs include an instruction, and the instruction is used to obtain the attribute information of the to-be-displayed chat record; and generate the display manner control information according to the attribute information of the to-be-displayed chat record.

With reference to the first possible implementation manner of the third aspect, in a second possible implementation manner of the third aspect, the electronic device further includes one or more programs, where the one or more programs include an instruction, and the instruction is used to, when the to-be-displayed chat record includes a first content unit and a second content unit, set a display time interval between a display start moment of the first content unit and a display start moment of the second content unit; and generate the display manner control information that includes the display time interval, and displaying the to-be-displayed chat record in a display manner specified by the display manner control information includes successively displaying the first content unit and the second content unit according to the display time interval.

With reference to the second possible implementation manner of the third aspect, in a third possible implementation manner of the third aspect, the electronic device further includes one or more programs, where the one or more programs include an instruction, and the instruction is used to obtain a generation time interval between a generation moment of the first content unit and a generation moment of the second content unit; and when the generation time interval is greater than or equal to a first threshold, set the display time interval to a first interval value; or when the generation time interval is less than a first threshold and is greater than a second threshold, set the display time interval to a second interval value; or when the generation time interval is less than or equal to a second threshold, set the display time interval to a third interval value, where the first threshold is greater than the second threshold, the first interval value is greater than the second interval value, and the second interval value is greater than the third interval value.

With reference to the first possible implementation manner of the third aspect, in a fourth possible implementation manner of the third aspect, the electronic device further includes one or more programs, where the one or more programs include an instruction, and the instruction is used to set display effect control information of a specified content unit according to attribute information of the specified content unit in the to-be-displayed chat record; and generate the display manner control information that includes the display effect control information; and displaying the to-be-displayed chat record in a display manner specified by the display manner control information includes displaying the specified content unit by using a display effect corresponding to the display effect control information.

With reference to the fourth possible implementation manner of the third aspect, in a fifth possible implementation manner of the third aspect, the electronic device further includes one or more programs, where the one or more programs include an instruction, and the instruction is used to set the display effect control information of the specified content unit as first preset display effect control information corresponding to a content sender of the specified content unit.

With reference to the fourth possible implementation manner of the third aspect, in a sixth possible implementation manner of the third aspect, the electronic device further includes one or more programs, where the one or more programs include an instruction, and the instruction is used to set the display effect control information of the specified content unit as second preset display effect control information corresponding to a semantic feature included in the specified content unit.

With reference to the fourth possible implementation manner of the third aspect, in a seventh possible implementation manner of the third aspect, the electronic device further includes one or more programs, where the one or more programs include an instruction, and the instruction is used to set the display effect control information of the specified content unit as third preset display effect control information corresponding to a first specified user state, where the first specified user state is a user state of a content sender of the specified content unit when the content unit is generated; or set the display effect control information of the specified content unit as fourth preset display effect control information corresponding to a second specified user state, where the second specified user state is a user state of a content sender of the specified content unit when a historical chat record is displayed.

With reference to the third aspect, in an eighth possible implementation manner of the third aspect, the electronic device further includes one or more programs, where the one or more programs include an instruction, and the instruction is used to receive the display manner control information that is generated based on the attribute information of the to-be-displayed chat record and sent by a control information generation device.

With reference to the eighth possible implementation manner of the third aspect, in a ninth possible implementation manner of the third aspect, the electronic device further includes one or more programs, where the one or more programs include an instruction, and the instruction is used to, when the to-be-displayed chat record includes a first content unit and a second content unit, receive the display manner control information that is generated and sent by the control information generation device, where the display manner control information includes a display time interval; and displaying the to-be-displayed chat record in a display manner specified by the display manner control information includes successively displaying the first content unit and the second content unit according to the display time interval.

With reference to the eighth possible implementation manner of the third aspect, in a tenth possible implementation manner of the third aspect, the electronic device further includes one or more programs, where the one or more programs include an instruction, and the instruction is used to receive the display manner control information that is generated and sent by the control information generation device, where the display manner control information includes display effect control information of a specified content unit; and displaying the to-be-displayed chat record in a display manner specified by the display manner control information includes displaying the specified content unit by using a display effect corresponding to the display effect control information.

With reference to the third aspect or any one of the first to the tenth possible implementation manners of the third aspect, in an eleventh possible implementation manner of the third aspect, the electronic device further includes one or more programs, where the one or more programs include an instruction, and the instruction is used to obtain an original historical chat record that meets a pre-determined screening condition; search for association information associated with attribute information of the original historical chat record; and generate the to-be-displayed chat record that includes the original historical chat record and the association information.

With reference to the third aspect or any one of the first to the eleventh possible implementation manners of the third aspect, the electronic device further includes one or more programs, where the one or more programs include an instruction, and the instruction is used to obtain a script by combining the display manner control information with the display chat record and run the script.

According to a fourth aspect, an embodiment of the disclosure further provides a computer storage medium, where the computer storage medium stores a program, and when being executed, the program may include some or all steps of the method for displaying a historical chat record described in any one of possible implementation manners of the first aspect.

In the embodiments of the disclosure, a terminal can determine a to-be-displayed chat record; obtain display manner control information, where the display manner control information is generated based on attribute information of the to-be-displayed chat record; and display the to-be-displayed chat record in a display manner specified by the display manner control information. By using the embodiments of the disclosure, the terminal can display different to-be-displayed chat records in different display manners, and display manners of the to-be-displayed chat record are diverse.

BRIEF DESCRIPTION OF DRAWINGS

To describe the technical solutions in the embodiments of the disclosure or in the prior art more clearly, the following briefly describes the accompanying drawings required for describing the embodiments or the prior art. A person of ordinary skill in the art may still derive other drawings from these accompanying drawings without creative efforts.

DESCRIPTION OF EMBODIMENTS

Figure 1:
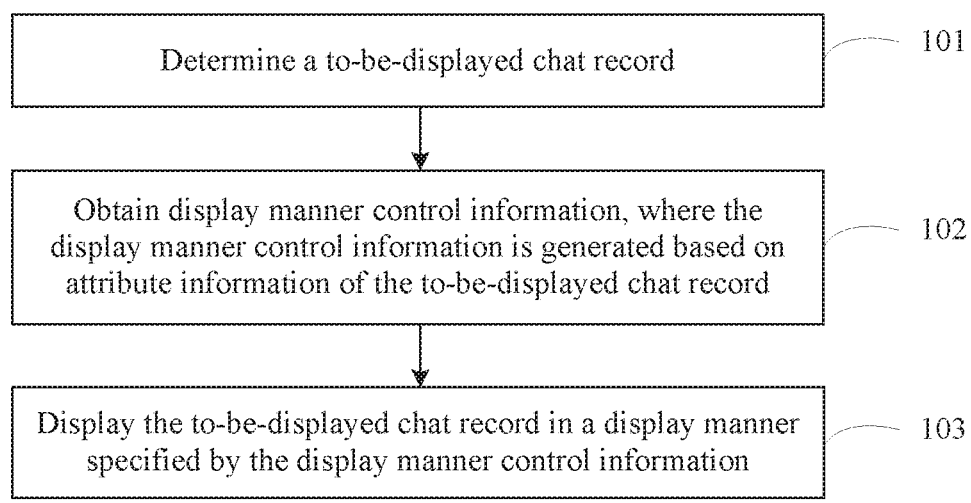
FIG. 1 is a flowchart of an embodiment of a method for displaying a to-be-displayed chat record according to the disclosure.

To make a person skilled in the art understand the technical solutions in the disclosure better, the following clearly and completely describes the technical solutions in the embodiments of the disclosure with reference to the accompanying drawings in the embodiments of the disclosure. The described embodiments are merely a part rather than all of the embodiments of the disclosure. All other embodiments obtained by a person of ordinary skill in the art based on the embodiments of the disclosure without creative efforts shall fall within the protection scope of the disclosure.

In the embodiments of the disclosure, a historical chat record is generated by a terminal or a server according to chat information sent by a user during an instant chat. The historical chat record includes, but is not limited to, a form such as a short message service message record, a message record in a chat application, a group chat record in a chat room, or a post or reply record at a forum. The form of the historical chat record may be of different types, such as a text, a voice, an image, an animation, or a video.

In the embodiments of the disclosure, the historical chat record, as a whole, may be constituted by multiple content units. Each content unit may include a part of relatively independent chat records. For example, each content unit may be a section of a text, a section of a voice, a section of a video, a section of an animation, or an image. The content units of the historical chat record may be grouped according to a pre-determined rule. Because the historical chat record is generated based on the chat information, the content unit and the chat information may have a one-to-one, one-to-many, or many-to-one relationship. For example, one piece of chat information may be used as one content unit; or one piece of chat information may be split into multiple content units according to content included in the chat information; or multiple pieces of chat information sent by a same user within a short time may be combined into one content unit according to a sending time of the chat information.

In the embodiments of the disclosure, an original historical chat record refers to a part that is of all historical chat records and meets a pre-determined screening condition. The screening condition may be a chat start time, a chat stop time, a chat topic, a chat participant, or the like. Association information of the original historical chat record refers to information that does not belong to the original historical chat record and is related to the original historical chat record. For example, the association information may include an online state of the chat participant from the chat start time to the chat stop time, chat information that is related to the chat topic and sent by the chat participant within another period of time, or the like.

In the embodiments of the disclosure, display manner control information refers to information that is used to control a display manner of a chat record. The terminal may display a to-be-displayed chat record in a display manner specified by the display manner control information, where the display manner control information may include multiple pieces of display manner control sub-information, and each piece of display manner control sub-information is used to control a display manner of one or more content units. The display manner includes, but is not limited to, effects in a visual aspect, an auditory aspect, and a tactile aspect. For example, the effect may include a font, a color, a time interval between displaying of content units, a transparency, a movement track, whether to display by being superimposed on other content, background sound, a vibration effect, or the like.

In the embodiments of the disclosure, attribute information indicates information that is used to reflect an inherent nature of the to-be-displayed chat information or the content unit. Attribute information of the to-be-displayed chat information may include information such as an information type, a sender, or a sending time of the to-be-displayed chat information. Attribute information of the content unit may include information such as a content sender or a sending time of the content unit.

Referring to FIG. 1, FIG. 1 is a flowchart of an embodiment of a method for displaying a to-be-displayed chat record according to the disclosure. As shown in FIG. 1, this embodiment includes the following steps.

Step 101: Determine a to-be-displayed chat record.

A terminal may obtain all historical chat records from a memory of the terminal itself or a server, and then obtain, by means of screening, an original chat record that meets a pre-determined screening condition from all the historical chat records; or a terminal may send the screening condition to a server, and the server obtains, by means of screening, an original chat record that meets the pre-determined screening condition from all historical chat records stored in the server, and sends the original chat record to the terminal.

After obtaining the original chat record, the terminal may directly use the original chat record as the to-be-displayed chat record; or the terminal may obtain association information associated with attribute information of the original historical chat record, and generate the to-be-displayed chat record that includes the original historical chat record and the association information.

Step 102: Obtain display manner control information, where the display manner control information is generated based on attribute information of the to-be-displayed chat record.

After obtaining the to-be-displayed chat record, the terminal may obtain the attribute information of the to-be-displayed chat record, and generate the display manner control information according to the attribute information of the to-be-displayed chat record; or the terminal may receive the display manner control information that is generated based on the attribute information of the to-be-displayed chat record and sent by a control information generation device, where the control information generation device may be a server or another terminal. If the terminal receives the display manner control information sent by the server, a data processing burden on the terminal may be alleviated. If the terminal generates the display manner control information, different to-be-displayed chat records can be displayed in different display manners without changing an existing server.

When the terminal generates the display manner control information, if the to-be-displayed chat record includes multiple content units, the terminal may separately set corresponding display manner control sub-information for each content unit, so as to obtain the display manner control information constituted by the display manner control sub-information.

Optionally, when the to-be-displayed chat record includes a first content unit and a second content unit, the terminal may set a display time interval between a display start moment of the first content unit and a display start moment of the second content unit, and then generate the display manner control information that includes the display time interval.

Optionally, the terminal may set display effect control information of a specified content unit according to attribute information of the specified content unit in the to-be-displayed chat record, and then generate the display manner control information that includes the display effect control information.

When the control information generation device generates the display manner control information, if the to-be-displayed chat record includes multiple content units, the server may also separately set corresponding display manner control sub-information for each content unit, so as to obtain the display manner control information constituted by the display manner control sub-information.

Optionally, when the to-be-displayed chat record includes a first content unit and a second content unit, the terminal may receive the display manner control information that is generated and sent by the control information generation device, where the display manner control information includes a display time interval.

Optionally, the terminal may receive the display manner control information that is generated and sent by the control information generation device, where the display manner control information includes display effect control information of a specified content unit.

When sending the display manner control information to the terminal, the server may separately send the to-be-displayed chat record and the display manner control information, or may send the display manner control information after combining the to-be-displayed chat record with the display manner control information.

Step 103: Display the to-be-displayed chat record in a display manner specified by the display manner control information.

After obtaining the display manner control information, the terminal may display the to-be-displayed chat record in the display manner specified by the display manner control information.

When the display manner control information includes the display time interval between the display start moment of the first content unit and the display start moment of the second content unit, the terminal may successively display the first content unit and the second content unit according to the display time interval. In this manner, multiple content units may be displayed one by one, and all to-be-displayed chat records can be avoided from being simultaneously displayed, thereby diversifying display manners of a historical chat record.

When the display manner control information includes the display effect control information, the terminal may display the content unit by using a display effect corresponding to the display effect control information. In this manner, to-be-displayed chat records that have different attribute information can be displayed in different display manners, thereby diversifying display manners of a historical chat record.

It should be noted herein that the display manner control information may include only the display time interval or the display manner control information, or may include both the display time interval and the display manner control information.

In this embodiment, a to-be-displayed chat record is determined; display manner control information is obtained, where the display manner control information is generated based on attribute information of the to-be-displayed chat record; and the to-be-displayed chat record is displayed in a display manner specified by the display manner control information. By using this embodiment, the to-be-displayed chat record can be displayed in different display manners according to a difference of the attribute information of the to-be-displayed chat record, thereby diversifying display manners of the to-be-displayed chat record.

Figure 2:
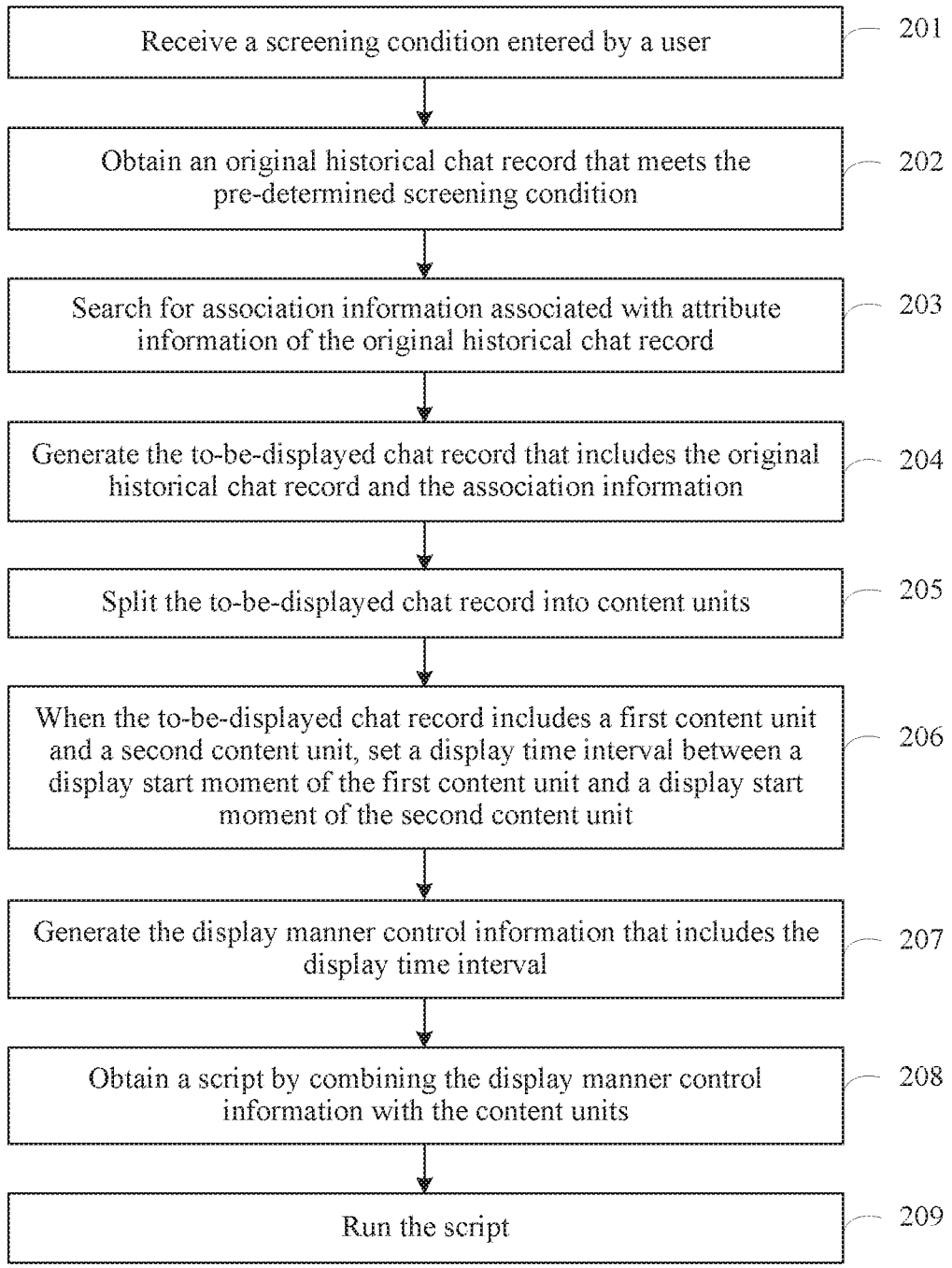
FIG. 2 is a flowchart of another embodiment of a method for displaying a to-be-displayed chat record according to the disclosure.

Referring to FIG. 2, FIG. 2 is a flowchart of another embodiment of a method for displaying a to-be-displayed chat record according to the disclosure. With reference to FIG. 2, the following further describes the disclosure by using an example in which a terminal sets different display effect control information for different content units. This embodiment may be executed by the terminal.

Step 201: Receive a screening condition entered by a user.

The terminal first receives the screening condition entered by the user or a screening condition preset by the user.

Step 202: Obtain an original historical chat record that meets the pre-determined screening condition.

When a historical chat record is stored in a memory of the terminal itself, the terminal may directly screen all historical chat records according to the screening condition, so as to obtain the original historical chat record that meets the screening condition.

When a historical chat record is stored in a server, the terminal may first obtain all historical chat records from the server, and then screen all the historical chat records according to the screening condition, so as to obtain the original historical chat record that meets the screening condition.

Step 203: Search for association information associated with attribute information of the original historical chat record.

After obtaining the original historical chat record, the terminal may search information stored by the terminal itself for the association information associated with the attribute information of the original historical chat record, or may search another device such as a server for the association information.

Step 204: Generate the to-be-displayed chat record that includes the original historical chat record and the association information.

After obtaining the association information, the terminal may use the association information as one or several content units and insert the association information into the original historical chat record, or may separately insert the association information into all content units of the original historical chat record, so as to obtain the to-be-displayed chat record that includes the original historical chat record and the association information.

Step 205: Split the to-be-displayed chat record into content units.

The terminal may split the to-be-displayed chat record into several content units according to a difference of a content form and a difference of a semantic feature of the to-be-displayed chat record. The semantic feature may be understood as follows: A semantic class is further classified from a particular perspective, so that words that originally belong to a same semantic class may have different values for one or several semantic features, so as to highlight a difference between these words. The value for one or several semantic features is the semantic feature value, where the semantic feature value is used to indicate a semantic feature of the interface element. "G510" is used as an example, where "G510" may include at least two semantic feature values: a "train number" and a "mobile phone model". "Beijing" is used as an example, where "Beijing" may include at least three semantic feature values: a "city", a "place name", and a "scenic spot".

In an example, the to-be-displayed chat content is as follows: "Daxiong: A screen of a mobile phone is black in a turned-off state. It does not go well with a non-black housing. Xiaoxiong: May the screen not be totally black? Daxiong: (an image) (a section of a voice)", and content units obtained by means of splitting may be shown in Table 1, where each row in Table 1 represents one content unit.

TABLE 1

| Chat content unit |
| --- |
| A screen of a mobile phone is black in a turned-off state. |
| It does not go well with a non-black housing. |
| May the screen not be totally black? |
| . . . (an image) |
| . . . (a section of audio) |

Step 206: When the to-be-displayed chat record includes a first content unit and a second content unit, set a display time interval between a display start moment of the first content unit and a display start moment of the second content unit.

The first content unit and the second content unit may be any two adjacent content units in the to-be-displayed chat record, where the adjacent content units means that generation times of historical chat records corresponding to the two content units are adjacent or historical chat records corresponding to the two content units have an association relationship in terms of semantic feature.

When setting the display time interval, the terminal may first obtain a generation time interval between a generation moment of the first content unit and a generation moment of the second content unit; and when the generation time interval is greater than or equal to a first threshold, set the display time interval to a first interval value; or when the generation time interval is less than a first threshold and is greater than a second threshold, set the display time interval to a second interval value; or when the generation time interval is less than or equal to a second threshold, set the display time interval to a third interval value. The first threshold, the second threshold, the first interval value, the second interval value, and the third interval value may be all set according to a requirement, and the first threshold is greater than the second threshold, the first interval value is greater than the second interval value, and the second interval value is greater than the third interval value.

For example, when the first threshold is 5 minutes, the second threshold is set to 1 minute, the first interval value is 3 seconds, the second interval value is 2 seconds, and the third interval value is 1 second, if the generation time interval between the generation moment of the first content unit and the generation moment of the second content unit is 6 minutes, the display time interval may be set to 3 seconds, that is, the second content unit is to be displayed after the first content unit is displayed for 3 seconds; or if the generation time interval between the generation moment of the first content unit and the generation moment of the second content unit is 2 minutes, the display time interval may be set to 2 seconds, that is, the second content unit is to be displayed after the first content unit is displayed for 2 seconds. In a practical application, more or fewer thresholds and interval values can be set. In this manner, when the terminal displays the to-be-displayed chat record, the user's participation enthusiasm during an instant chat can be reflected to a degree, thereby diversifying display manners of a historical chat record.

Step 207: Generate the display manner control information that includes the display time interval.

After the display time interval is generated, the display manner control information may be generated. The display manner control information may be constituted by multiple pieces of display manner control sub-information, and each piece of display manner control sub-information is corresponding to one content unit. The display manner control sub-information includes a time interval between displaying of the content unit and displaying of a previous content unit.

When the to-be-displayed chat record includes multiple content units shown in Table 1, for a correspondence between a content unit and display manner control sub-information, reference may be made to Table 2.

TABLE 2

| Chat content unit | Display manner control sub-information | Description |
| --- | --- | --- |
| A screen of a mobile phone is black in a turned-off state. | | |
| It does not go well with a non-black housing. | <sleep>1s</sleep> | Display time interval: 1 second |
| May the screen not be totally black? | <sleep>3s</sleep> | Display time interval: 3 seconds |
| . . . (an image) | <sleep>1s</sleep> | Display time interval: 1 second |
| . . . (a section of audio) | <sleep>1s</sleep> | Display time interval: 1 second |

As shown in Table 2, each piece of display manner control sub-information includes a time interval between displaying of a previous content unit and displaying of a content unit corresponding to the display manner control sub-information.

Step 208: Obtain a script by combining the display manner control information with the content units.

After the display manner control information is generated, the terminal may obtain a script form by combining the display manner control information with the content units. It should be noted herein that in addition to a form such as JavaScript, the script in this embodiment of the disclosure may further include another form such as Extensible Markup Language (XML). The script is obtained by combining the display manner control information with the content units, which can be used to conveniently display the to-be-displayed chat record next time.

Step 209: Run the script.

After the script is generated, the terminal may execute the script, so as to implement display of the to-be-displayed chat record.

By using this embodiment, a terminal may set, according to a difference of a content unit of a to-be-displayed chat record, a time interval between displaying content units, and display all content units one by one according to the display time interval, thereby diversifying display manners of the to-be-displayed chat record.

It should be noted herein that, for ease of description, only an example in which the terminal generates the display manner control information that includes the display time interval is used for description in the foregoing embodiment. In a practical application, in addition to including the display time interval, the display manner control information may further include display effect control information or the like. For a generation manner of the display effect control information or the like, reference may be made to other embodiments of the disclosure, and details are not described herein.

Figure 3:
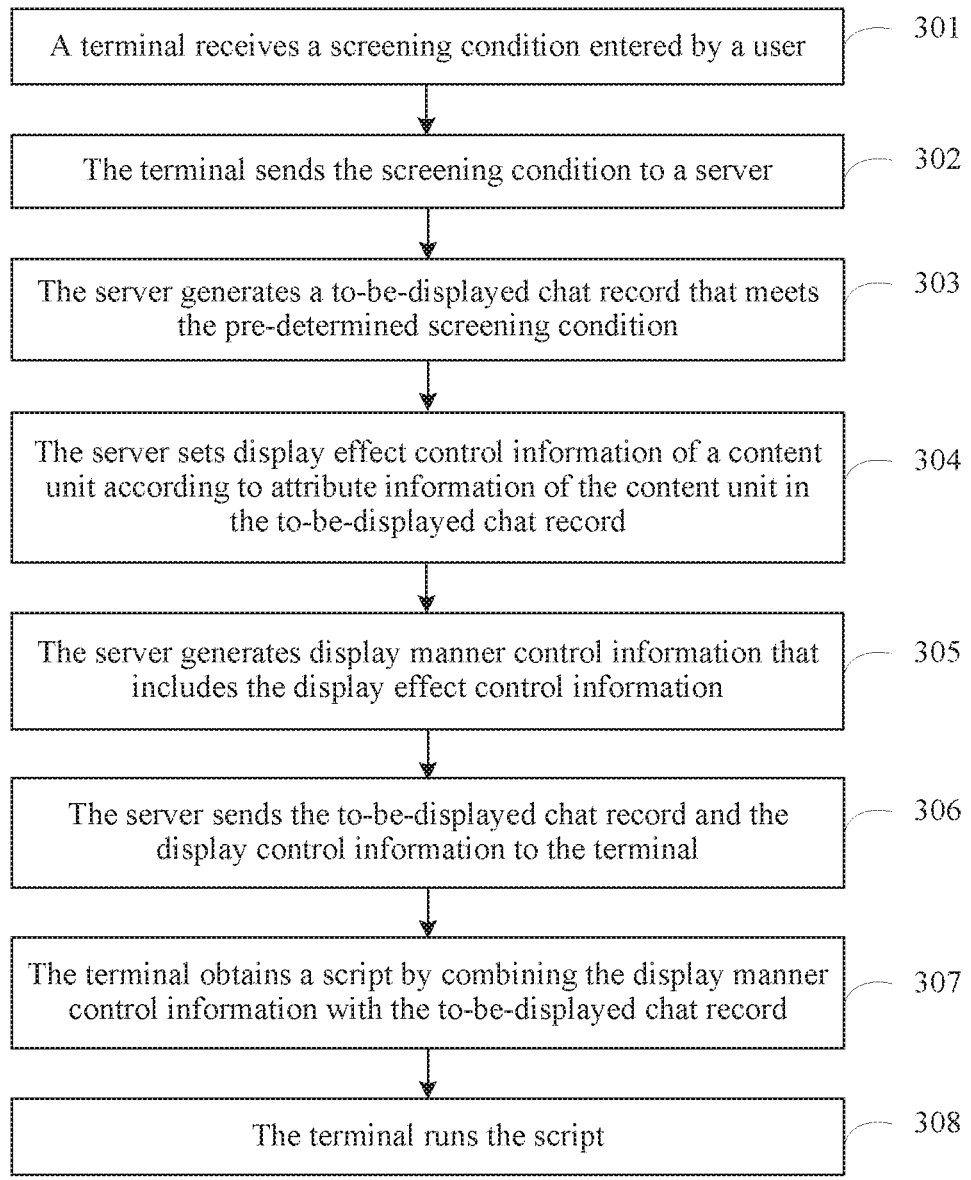
FIG. 3 is a flowchart of another embodiment of a method for displaying a to-be-displayed chat record according to the disclosure.

Referring to FIG. 3, FIG. 3 is a flowchart of another embodiment of a method for displaying a to-be-displayed chat record according to the disclosure. With reference to FIG. 2, the following further describes the disclosure by using an example in which a server sets display manner control information for a to-be-displayed chat record.

Step 301: A terminal receives a screening condition entered by a user.

Step 302: The terminal sends the screening condition to the server.

When a historical chat record is stored in the server, the terminal may send the screening condition to the server.

Step 303: The server generates a to-be-displayed chat record that meets the pre-determined screening condition.

Optionally, after receiving the screening condition sent by the terminal, the server may obtain, by means of screening, an original historical chat record that meets the screening condition, and then use the original historical chat record as the to-be-displayed chat record.

Optionally, after obtaining, by means of screening, an original historical chat record that meets the screening condition, the server may obtain association information of the original historical chat record, and use the association information as one or several content units and insert the association information into the original historical chat record, or separately insert the association information into all content units of the original historical chat record, so as to obtain the to-be-displayed chat record that includes the original historical chat record and the association information.

Step 304: The server sets display effect control information of a content unit according to attribute information of the content unit in the to-be-displayed chat record.

After obtaining the to-be-displayed chat record, the server may set display effect control information for the to-be-displayed chat record according to attribute information of the to-be-displayed chat record. When the to-be-displayed chat record includes multiple content units, the server may separately and independently set display effect control information for each content unit according to a difference of attribute information of the content units.

For example, when a content sender of the content unit is a preset sender, the display effect control information is set as first preset display effect control information corresponding to the sender. For another example, when the content unit includes a particular semantic feature, the display effect control information is set as second preset display effect control information corresponding to the specified keyword. For another example, when a user state of a content sender of the content unit is a specified state when the content unit is generated or when the historical chat record is displayed, the display effect control information is set as third preset display effect control information corresponding to the specified state.

Step 305: The server generates display manner control information that includes the display effect control information.

After setting the display effect, the server may generate the display manner control information that includes the display effect control information. When the to-be-displayed chat record includes multiple content units, the display effect control information may include several pieces of display effect control sub-information, where each piece of display effect control sub-information is corresponding to one content unit.

When the to-be-displayed chat record includes multiple content units shown in Table 1, for a correspondence between a content unit and display manner control sub-information, reference may be made to Table 3.

TABLE 3

| Chat content unit | Display manner control sub-information | Description |
| --- | --- | --- |
| A screen of a mobile phone is black in a turned-off state. | <color>red</color><br><bold>true</bold> | Color: red;<br>Bold: yes; |
| It does not go well with a non-black housing. | <sleep>1s</sleep><br><color>red</color><br><bold>true</bold> | Display time interval: 1 second<br>Color: red;<br>Bold: yes; |
| May the screen not be totally black? | <sleep>3s</sleep><br><color>red</color><br><bold>true</bold> | Display time interval: 3 seconds<br>Color: red;<br>Bold: yes; |
| . . . (an image) | <sleep>1s</sleep><br><color>yellow</color><br>$(" . . . ").fadeIn( )<br>$(" . . . ").fadeOut( ) | Display time interval: 1 second<br>Color: yellow;<br>Fade in: yes;<br>Fade out: yes; |
| . . . (a section of audio) | <sleep>1s</sleep> | Display time interval: 1 second |

As shown in Table 3, each piece of display manner control sub-information includes a time interval between displaying of a previous content unit and displaying of a content unit corresponding to the display manner control sub-information, and display effect control sub-information of the content unit.

Step 306: The server sends the to-be-displayed chat record and the display control information to the terminal.

In another embodiment, alternatively, the server may send only the to-be-displayed chat record, and the terminal generates by itself the display manner control information that includes the display effect control information.

Step 307: The terminal obtains a script by combining the display manner control information with the to-be-displayed chat record.

After receiving the display manner control information and the to-be-displayed chat record, the terminal may obtain the script by combining the display manner control information with the content units.

In another embodiment, alternatively, the server may obtain the script by combining the display manner control information with the to-be-displayed chat record and send the script to the terminal.

An example in which a script form is XML is used, and script content corresponding to Table 3 is as follows.

```
<show>
  <record>
    <content>A screen of a mobile phone is black in a turned-off state</content>
    <author>Daxiong</author>
    <color>red</color>
    <bold>true</bold>
    <sleep>2s</sleep>
  </record>
  <record>
    <content>It does not go well with a non-black housing</content>
    <author>Xiaoxiong</author>
    <color>red</color>
    <sleep>1s</sleep>
  </record>
  <record>
    <content>May the screen not be totally black</content>
    <author>Xiaoxiong</author>
    <color>red</color>
    <sleep>3s</sleep>
  </record>
  <record>
    <content><img src="computer.gif"></content>
    <author>Xiaoxiong</author>
    <sleep>1s</sleep>
  </record>
  <record>
    <content><sound src="computer.mp3"></content>
    <author>Xiaoxiong</author>
    <sleep>1s</sleep>
  </record>
<show>
```

Step 308: The terminal runs the script.

After the script is generated, the terminal may execute the script, so as to implement display of the to-be-displayed chat record.

By using this embodiment, the terminal may receive display effect control information generated by a server, and display the to-be-displayed chat record in a display manner corresponding to the display effect control information, thereby diversifying display manners of the to-be-displayed chat record.

It should be noted herein that, for ease of description, only an example in which the server generates the display manner control information that includes the display effect control information is used for description in the foregoing embodiment. In a practical application, in addition to including the display effect control information, the display manner control information may further include a display time interval or the like. For a generation manner of the display time interval or the like, reference may be made to other embodiments of disclosure, and details are not described herein.

Figure 4:
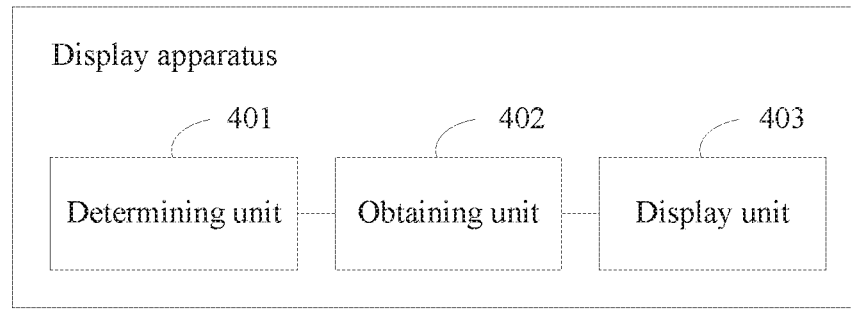
FIG. 4 is a schematic structural diagram of an embodiment of an apparatus for displaying a to-be-displayed chat record according to the disclosure.

Referring to FIG. 4, FIG. 4 is a schematic structural diagram of an embodiment of an apparatus for displaying a historical chat record according to the disclosure.

As shown in FIG. 4, the apparatus includes a determining unit 401, an obtaining unit 402, and a display unit 403.

The determining unit 401 is configured to determine a to-be-displayed chat record; the obtaining unit 402 is configured to obtain display manner control information, where the display manner control information is generated based on attribute information of the to-be-displayed chat record; and the display unit 403 is configured to display the to-be-displayed chat record in a display manner specified by the display manner control information.

Figure 5:
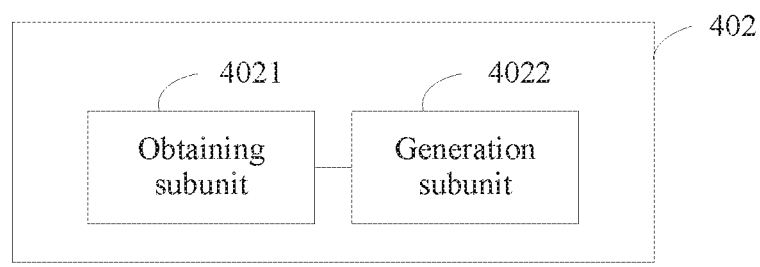
FIG. 5 is a schematic structural diagram of an embodiment of an obtaining unit of an apparatus for displaying a to-be-displayed chat record according to the disclosure.

Optionally, as shown in FIG. 5, the obtaining unit 402 may include an obtaining subunit 4021 configured to obtain the attribute information of the to-be-displayed chat record; and a generation subunit 4022 configured to generate the display manner control information according to the attribute information of the to-be-displayed chat record.

The generation subunit 4022 may include a time interval setting subunit configured to, when the to-be-displayed chat record includes a first content unit and a second content unit, set a display time interval between a display start moment of the first content unit and a display start moment of the second content unit; and a first control information generation subunit configured to generate the display manner control information that includes the display time interval. The display unit 403 may be configured to successively display the first content unit and the second content unit according to the display time interval.

The time interval setting subunit may be configured to, when a generation time interval between a generation moment of the first content unit and a generation moment of the second content unit is greater than or equal to a first threshold, set the display time interval to a first interval value; or when the generation time interval is less than a first threshold and is greater than a second threshold, set the display time interval to a second interval value; or when the generation time interval is less than or equal to a second threshold, set the display time interval to a third interval value, where the first threshold is greater than the second threshold, the first interval value is greater than the second interval value, and the second interval value is greater than the third interval value.

Alternatively, the generation subunit 4022 may include a display effect setting subunit configured to set display effect control information of a specified content unit according to attribute information of the specified content unit in the to-be-displayed chat record; and a second control information generation subunit configured to generate the display manner control information that includes the display effect control information; and the display unit 403 may be configured to display the specified content unit by using a display effect corresponding to the display effect control information.

When the attribute information of the specified content unit is a content sender of a content unit, the second display effect setting subunit may be configured to set the display effect control information of the specified content unit as first preset display effect control information corresponding to a content sender of the specified content unit.

When the attribute information of the specified content unit is a semantic feature included in a content unit, the second display effect setting subunit may be configured to set the display effect control information of the specified content unit as second preset display effect control information corresponding to a semantic feature included in the specified content unit.

When the attribute information of the specified content unit is a user state of a content sender, the second display effect setting subunit may be configured to set the display effect control information of the specified content unit as third preset display effect control information corresponding to a first specified user state, where the first specified user state is a user state of a content sender of the specified content unit when the content unit is generated; or set the display effect control information of the specified content unit as fourth preset display effect control information corresponding to a second specified user state, where the second specified user state is a user state of a content sender of the specified content unit when a historical chat record is displayed.

Optionally, the obtaining unit 402 may be further configured to receive the display manner control information that is generated based on the attribute information of the to-be-displayed chat record and sent by a control information generation device.

The obtaining unit 402 may be configured to, when the to-be-displayed chat record includes a first content unit and a second content unit, receive the display manner control information that is generated and sent by the control information generation device, where the display manner control information includes a display time interval; and the display unit 403 may be configured to successively display the first content unit and the second content unit according to the display time interval.

Alternatively, the obtaining unit 402 may be configured to receive the display manner control information that is generated and sent by the control information generation device, where the display manner control information includes display effect control information of a specified content unit; and the display unit 403 may be configured to display the specified content unit by using a display effect corresponding to the display effect control information.

Figure 6:
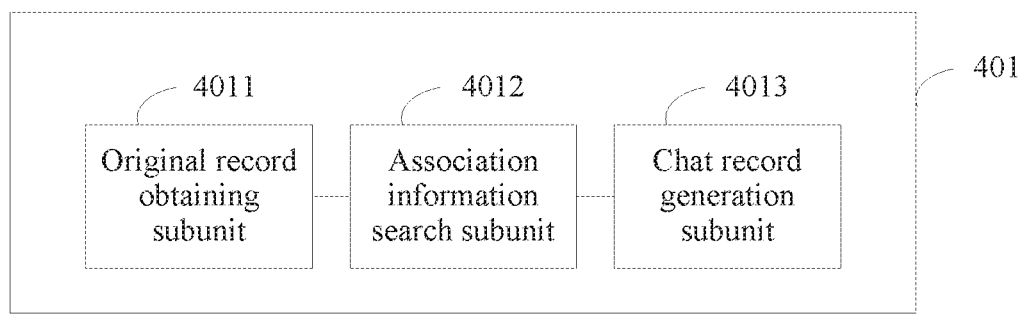
FIG. 6 is a schematic structural diagram of an embodiment of a determining unit of an apparatus for displaying a to-be-displayed chat record according to the disclosure.

Optionally, as shown in FIG. 6, the determining unit 401 may include an original record obtaining subunit 4011 configured to obtain an original historical chat record that meets a pre-determined screening condition; an association information search subunit 4012 configured to search for association information associated with attribute information of the original historical chat record; and a chat record generation subunit 4013 configured to generate the to-be-displayed chat record that includes the original historical chat record and the association information.

Optionally, the display unit 403 may include a script combination subunit configured to obtain a script by combining the display manner control information with the display chat record; and a script running subunit configured to run the script.

By using this embodiment, the to-be-displayed chat record can be displayed in different display manners according to a difference of attribute information of the to-be-displayed chat record, thereby diversifying display manners of the to-be-displayed chat record.

Figure 7:
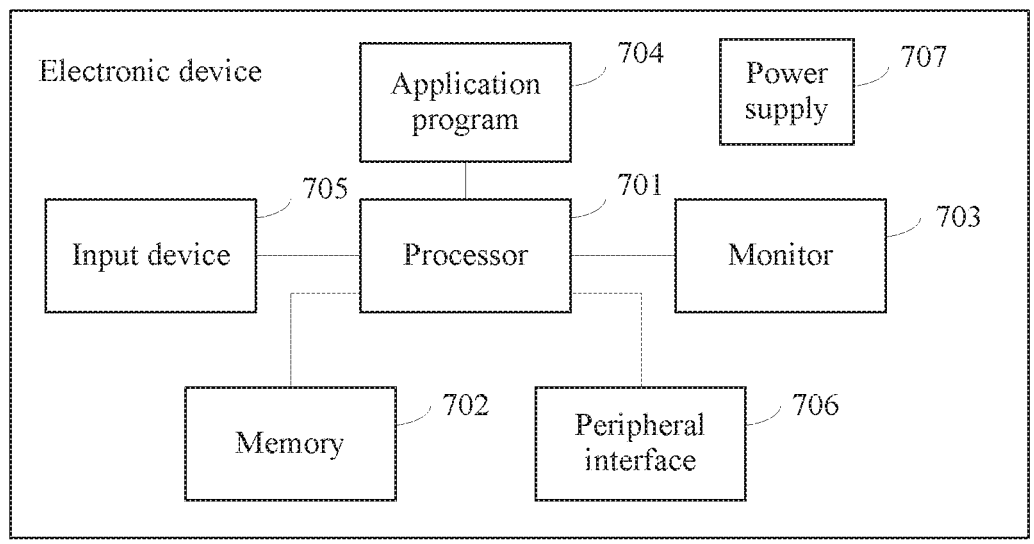
FIG. 7 is a schematic structural diagram of an embodiment of an electronic device according to the disclosure.

Referring to FIG. 7, FIG. 7 is a schematic structural diagram of an embodiment of an electronic device in the disclosure. The electronic device may include a mobile phone, a tablet, a personal digital assistant (PDA), a point of sales (POS), a vehicle-mounted computer, or the like. The terminal may execute a method for displaying a to-be-displayed chat record in the foregoing embodiments.

FIG. 7 shows a block diagram of a partial structure of the electronic device in this embodiment. Referring to FIG. 7, the electronic device may include one or more processors 701, a memory 702, a monitor 703, and one or more application programs 704, and in addition, may include an input device 705, a peripheral interface 706, a power supply 707, or the like. The monitor 703 includes a touch-sensitive surface and a display screen. The one or more programs are stored in the memory 702, and are configured for execution by the one or more processors 701.

The electronic device may include one or more programs, where the one or more programs include an instruction, and the instruction is used to determine a to-be-displayed chat record; obtain display manner control information, where the display manner control information is generated based on attribute information of the to-be-displayed chat record; and display the to-be-displayed chat record in a display manner specified by the display manner control information.

Optionally, the electronic device further includes one or more programs, where the one or more programs include an instruction, and the instruction is used to obtain the attribute information of the to-be-displayed chat record; and generate the display manner control information according to the attribute information of the to-be-displayed chat record.

Optionally, the electronic device further includes one or more programs, where the one or more programs include an instruction, and the instruction is used to, when the to-be-displayed chat record includes a first content unit and a second content unit, set a display time interval between a display start moment of the first content unit and a display start moment of the second content unit; and generate the display manner control information that includes the display time interval; and the displaying the to-be-displayed chat record in a display manner specified by the display manner control information includes successively displaying the first content unit and the second content unit according to the display time interval.

Optionally, the electronic device further includes one or more programs, where the one or more programs include an instruction, and the instruction is used to obtain a generation time interval between a generation moment of the first content unit and a generation moment of the second content unit; and when the generation time interval is greater than or equal to a first threshold, set the display time interval to a first interval value; or when the generation time interval is less than a first threshold and is greater than a second threshold, set the display time interval to a second interval value; or when the generation time interval is less than or equal to a second threshold, set the display time interval to a third interval value, where the first threshold is greater than the second threshold, the first interval value is greater than the second interval value, and the second interval value is greater than the third interval value.

Optionally, the electronic device further includes one or more programs, where the one or more programs include an instruction, and the instruction is used to set display effect control information of a specified content unit according to attribute information of the specified content unit in the to-be-displayed chat record; and generate the display manner control information that includes the display effect control information; and the displaying the to-be-displayed chat record in a display manner specified by the display manner control information includes displaying the specified content unit by using a display effect corresponding to the display effect control information.

Optionally, the electronic device further includes one or more programs, where the one or more programs include an instruction, and the instruction is used to set the display effect control information of the specified content unit as first preset display effect control information corresponding to a content sender of the specified content unit.

Optionally, the electronic device further includes one or more programs, where the one or more programs include an instruction, and the instruction is used to set the display effect control information of the specified content unit as second preset display effect control information corresponding to a semantic feature included in the specified content unit.

Optionally, the electronic device further includes one or more programs, where the one or more programs include an instruction, and the instruction is used to set the display effect control information of the specified content unit as third preset display effect control information corresponding to a first specified user state, where the first specified user state is a user state of a content sender of the specified content unit when the content unit is generated; or set the display effect control information of the specified content unit as fourth preset display effect control information corresponding to a second specified user state, where the second specified user state is a user state of a content sender of the specified content unit when a historical chat record is displayed.

Optionally, the electronic device further includes one or more programs, where the one or more programs include an instruction, and the instruction is used to receive the display manner control information that is generated based on the attribute information of the to-be-displayed chat record and sent by a control information generation device.

Optionally, the electronic device further includes one or more programs, where the one or more programs include an instruction, and the instruction is used to, when the to-be-displayed chat record includes a first content unit and a second content unit, receive the display manner control information that is generated and sent by the control information generation device, where the display manner control information includes a display time interval; and the displaying the to-be-displayed chat record in a display manner specified by the display manner control information includes successively displaying the first content unit and the second content unit according to the display time interval.

Optionally, the electronic device further includes one or more programs, where the one or more programs include an instruction, and the instruction is used to receive the display manner control information that is generated and sent by the control information generation device, where the display manner control information includes display effect control information of a specified content unit; and the displaying the to-be-displayed chat record in a display manner specified by the display manner control information includes displaying the specified content unit by using a display effect corresponding to the display effect control information.

Optionally, the electronic device further includes one or more programs, where the one or more programs include an instruction, and the instruction is used to obtain an original historical chat record that meets a pre-determined screening condition; search for association information associated with attribute information of the original historical chat record; and generate the to-be-displayed chat record that includes the original historical chat record and the association information.

Optionally, the electronic device further includes one or more programs, where the one or more programs include an instruction, and the instruction is used to obtain a script by combining the display manner control information with the display chat record; and run the script.

Figure 8:
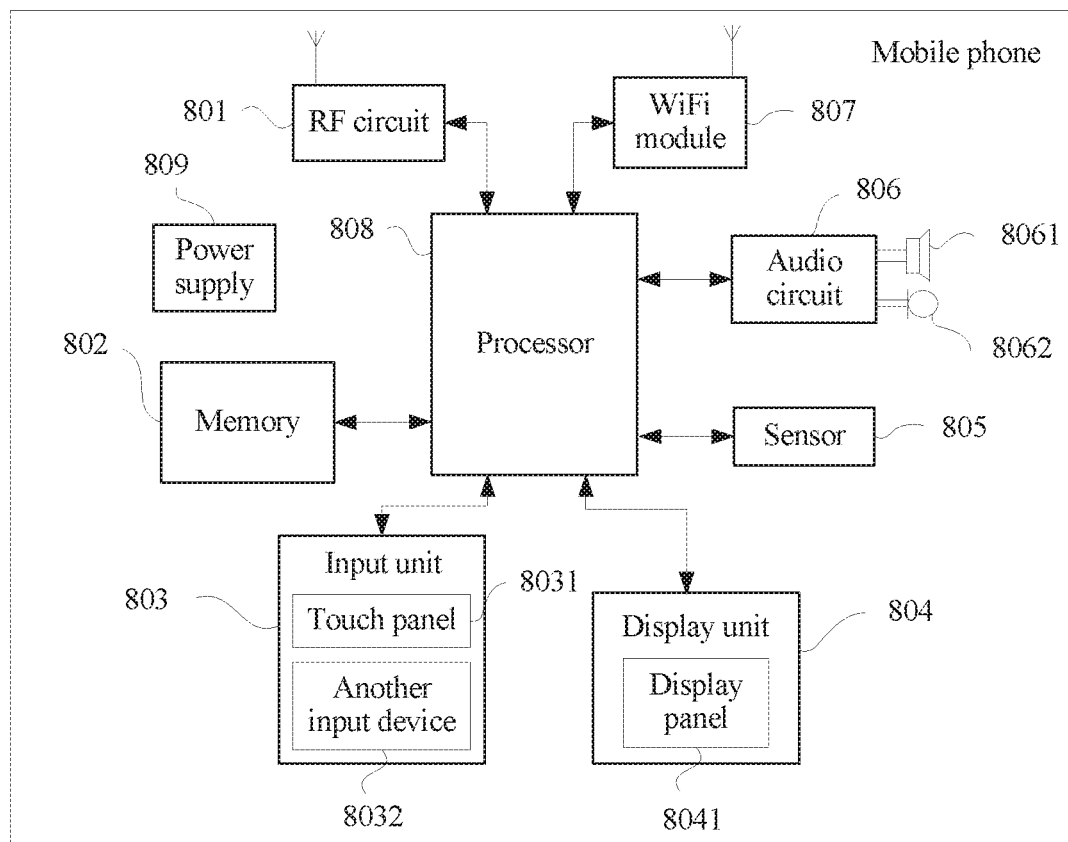
FIG. 8 is a schematic structural diagram of another embodiment of an electronic device according to the disclosure.

An example in which the electronic device is a mobile phone is used. FIG. 8 shows a block diagram of a partial structure of a mobile phone related to an embodiment of the disclosure. Referring to FIG. 8, the mobile phone includes components such as a radio frequency (RF) circuit 801, a memory 802, an input unit 803, a display unit 804, a sensor 805, an audio circuit 806, a wireless fidelity (WIFI) module 807, a processor 808, and a power supply 809. A person skilled in the art may understand that the structure of the mobile phone shown in FIG. 8 does not constitute any limitation on the mobile phone. The mobile phone may include components more or fewer than those shown in the diagram, or combine some components, or have a different component arrangement. The following describes the components of the mobile phone in detail with reference to FIG. 8.

The RF circuit 801 may be configured to receive and send a signal in an information receiving or sending process or a call process. Particularly, after receiving downlink information of a base station, the RF circuit 801 sends the downlink information to the processor 808 for processing; and in addition, sends uplink data of the mobile phone to the base station. Generally, the RF circuit includes but is not limited to an antenna, at least one amplifier, a transceiver, a coupler, a low noise amplifier (LNA), a duplexer, or the like. In addition, the RF circuit 801 may further communicate with a network and another device by means of radio communications. The radio communications may be based on any communication standard or protocol, which includes but is not limited to Global System for Mobile Communications (GSM), general packet radio service (GPRS), Code Division Multiple Access (CDMA), Wideband Code Division Multiple Access (WCDMA), Long Term Evolution (LTE), an email, a short message service (SMS), or the like.

The memory 802 may be configured to store a software program and a module. The processor 808, by running the software program and the module that are stored in the memory 802, performs various function applications of the mobile phone and data processing. The memory 802 may mainly include a program storage area and a data storage area. The program storage area may store an operating system, an application program (such as a sound play program or an image play program) that is required by at least one function, or the like. The data storage area may store data (such as audio data or a phonebook) that is created according to use of the mobile phone, or the like. In addition, the memory 802 may include a high-speed random access memory, and may further include a nonvolatile memory, such as at least one magnetic disk storage component, a flash memory component, or another volatile solid-state storage component.

The input unit 803 may be configured to receive entered digital or character information, and generate key signal input related to user setting and function control of the mobile phone. Specifically, the input unit 803 may include a touch panel 8031 and another input device 8032. The touch panel 8031, which is also referred to as a touchscreen, can collect a touch operation (for example, an operation of the user on the touch panel 8031 or near the touch panel 8031 by using any proper object or accessory, such as a finger or a stylus) of the user on or near the touch panel 8031, and drive a corresponding connected apparatus according to a preset program. Optionally, the touch panel 8031 may include two parts: a touch detection apparatus and a touch controller. The touch detection apparatus detects a touch position of the user, detects a signal brought by a touch operation, and transfers the signal to the touch controller. The touch controller receives touch information from the touch detection apparatus, converts the touch information into coordinates of a touch point, then sends the coordinates of the touch point to the processor 808, and can receive and execute a command sent by the processor 808. In addition, the touch panel 8031 may be implemented by using multiple types, such as a resistive type, a capacitive type, an infrared ray, and a surface acoustic wave. In addition to the touch panel 8031, the input unit 803 may further include another input device 8032. Specifically, the input device 8032 may include, but is not limited to, one or more of a physical keyboard, a function key (for example, a volume control key or an on/off key), a trackball, a mouse, an operating lever, or the like.

The display screen 804 may be configured to display information entered by the user or information provided for the user, and various menus of the mobile phone. The display screen 804 may include a display panel 8041. Optionally, the display panel 8041 may be configured in a form of a liquid crystal display (LCD), an organic light-emitting diode (OLED), or the like. Further, the touch panel 8031 may cover the display panel 8041. When detecting a touch operation on or near the touch panel 8031, the touch panel 8031 transfers the touch operation to the processor 808 to determine a type of a touch event, and then the processor 808 provides corresponding visual output on the display panel 8041 according to the type of the touch event. In FIG. 8, the touch panel 8031 and the display panel 8041 are used as two independent components to implement input and input functions of the mobile phone. However, in some embodiments, the touch panel 8031 and the display panel 8041 may be integrated to implement the input and output functions of the mobile phone.

The mobile phone may further include at least one sensor 805, such as a light sensor, a motion sensor, or another sensor. Specifically, the light sensor may include an ambient light sensor and a proximity sensor. The ambient light sensor may adjust luminance of the display panel 8041 according to brightness of ambient light, and when the mobile phone moves to an ear, the proximity sensor may turn off the display panel 8041 and/or backlight. As one type of a motion sensor, an acceleration sensor can detect values of accelerations in all directions (generally, three axes), can detect a value and a direction of the gravity in a static state, and can be used for an application that identifies a mobile phone posture (such as screen orientation, a related game, or magnetometer posture calibration), a function related to vibration identification (such as a pedometer or a stroke), and the like. For another sensor, such as a gyroscope, a barometer, a hygrometer, a thermometer, or an infrared sensor, that can be further disposed on the mobile phone, details are not described herein.

The audio circuit 806, a loudspeaker 8061, and a microphone 8062 may provide an audio interface between the user and the mobile phone. The audio circuit 806 may transmit, to the loudspeaker 8061, an electrical signal converted from received audio data, and the loudspeaker 8061 converts the electrical signal into a sound signal for output; in another aspect, the microphone 8062 converts a collected sound signal into an electrical signal, the audio circuit 806 converts the electrical signal into audio data upon receipt of the electrical signal, and then outputs the audio data to the RF circuit 801, so as to send the audio data to, for example, another mobile phone, or output the audio data to the memory 802 for further processing.

WIFI belongs to a short-distance wireless transmission technology. The mobile phone may help, by using the WIFI module 807, the user receive and send an email, browse a web page, access streaming media, and the like. The WIFI module 807 provides wireless broadband Internet access for the user. Although the WIFI module 807 is shown in FIG. 8, it should be understood that the WIFI module 807 is not a mandatory component of the mobile phone, and may be omitted according to a requirement without changing the essence of the disclosure.

The processor 808 is a control center of the mobile phone, is connected to each part of the entire mobile phone by using various interfaces and lines, and by running or executing the software program and/or the module that are/is stored in the memory 802 and by invoking data stored in the memory 802, performs various functions of the mobile phone and data processing, so as to perform overall monitoring on the mobile phone. Optionally, the processor 808 may include one or more processing units. Preferably, an application processor and a modem processor may be integrated into the processor 808, where the application processor mainly processes an operating system, a user interface, an application program, or the like; and the modem processor mainly processes radio communications. It can be understood that the foregoing modem processor may also not be integrated into the processor 808.

The mobile phone further includes the power supply 809 (such as a battery) that supplies power to each component. Preferably, the power supply may be logically connected to the processor 808 by using a power management system, so as to implement a management function, such as charging, discharging, and power consumption, by using the power management system.

Though not shown, the mobile phone may further include a camera, a BLUETOOTH® module, and the like, and details are not described herein. The RF circuit 801, the WIFI module 807, or the BLUETOOTH module may be used as a peripheral interface.

The mobile phone may include one or more programs, where the one or more programs include an instruction, and the instruction is used to determine a to-be-displayed chat record; obtain display manner control information, where the display manner control information is generated based on attribute information of the to-be-displayed chat record; and display the to-be-displayed chat record in a display manner specified by the display manner control information. For a specific manner in which the mobile phone displays a historical chat record, reference may be made to the foregoing embodiments, and details are not described herein.

By using this embodiment, the electronic device can display the to-be-displayed chat record in different display manners according to a difference of attribute information of the to-be-displayed chat record, thereby diversifying display manners of the to-be-displayed chat record.

A person skilled in the art may clearly understand that the technologies in the embodiments of the disclosure may be implemented by software in addition to a necessary universal hardware platform. Based on such an understanding, the technical solutions of the embodiments of the disclosure essentially or the part contributing to the prior art may be implemented in a form of a software product. The computer software product may be stored in a storage medium, such as a read only memory (ROM)/random access memory (RAM), a magnetic disk, or an optical disc, and includes several instructions for instructing a computer device (which may be a personal computer, a server, or a network device) to perform the methods described in the embodiments or some parts of the embodiments of the disclosure.

The embodiments in this specification are all described in a progressive manner; for same or similar parts in the embodiments, reference may be made to these embodiments; each embodiment focuses on a difference from other embodiments. Particularly, apparatus and electronic device embodiments are basically similar to a method embodiment, and therefore are described briefly; for related parts, reference may be made to descriptions in the method embodiment.

The foregoing descriptions are implementation manners of the disclosure, but are not intended to limit the protection scope of the disclosure. Any modification, equivalent replacement, and improvement made without departing from the spirit and principle of the disclosure shall fall within the protection scope of the disclosure.

What is claimed is:

1. A method for displaying a historical chat record, comprising:
  determining a to-be-displayed chat record comprising attribute information, wherein the to-be-displayed chat record includes an original historical chat record;
  obtaining, based on the attribute information, display manner control information for the to-be-displayed chat record, by:
    obtaining a generation time interval according to a first generation moment and a second generation moment of content in the original historical chat record of the to-be-displayed chat record;
    comparing the generation time interval with at least one threshold time interval;
    setting a display time interval of the to-be-displayed chat record to an interval value based on the comparison of the generation time interval with the at least one threshold time interval;
    obtaining one or more attributes from the attribute information of the to-be-displayed chat record;
    generating the display manner control information comprising display effect control information, wherein generating the display manner control information comprises setting the display time interval between a first display start moment of a first content and a second display start moment of a second content, and wherein the display manner control information comprises the display time interval;
  displaying the to-be-displayed chat record in the display manner specified by the display manner control information comprising displaying specified content, wherein a display effect corresponds to the display effect control information;
  setting the display effect control information of the specified content as a first preset display effect control information corresponding to a content sender of the specified content, wherein the attribute information of the specified content is the content sender of the specified content; and
  setting the display effect control information of the specified content as a second preset display effect control information corresponding to a semantic feature of the specified content when the attribute information of the specified content is the semantic feature of the specified content; and subsequently
  displaying the to-be-displayed chat record in a successive manner specified by the display manner control information.

2. The method of claim 1, wherein setting the display time interval between the display start moment of the first content and the display start moment of the second content comprises:
  obtaining the generation time interval between a first generation moment of the first content and a second generation moment of the second content;
  setting the display time interval to a first interval value when the generation time interval is greater than or equal to a first threshold time interval;
  setting the display time interval to a second interval value when the generation time interval is less than the first threshold time interval and is greater than a second threshold time interval; and
  setting the display time interval to a third interval value when the generation time interval is less than or equal to the second threshold time interval, wherein the first threshold time interval is greater than the second threshold time interval, wherein the first interval value is greater than the second interval value, and wherein the second interval value is greater than the third interval value.

3. The method of claim 1, wherein obtaining the display manner control information comprises receiving the display manner control information based on the attribute information of the to-be-displayed chat record from a control information generation device.

4. The method of claim 3, wherein receiving the display manner control information based on the attribute information of the to-be-displayed chat record comprises receiving the display manner control information when the to-be-displayed chat record comprises a first content and a second content, wherein the display manner control information comprises the display time interval, and wherein displaying the to-be-displayed chat record in the display manner specified by the display manner control information comprises successively displaying the first content and the second content according to the display time interval.

5. The method of claim 3, wherein the display manner control information comprises display effect control information of a specified content, and wherein displaying the to-be-displayed chat record in the display manner specified by the display manner control information comprises displaying the specified content by using a display effect corresponding to the display effect control information.

6. The method of claim 1, wherein determining the to-be-displayed chat record comprises:
  obtaining the original historical chat record by determining historical chat records that meet a pre-determined screening condition;
  searching for association information associated with second attribute information of the original historical chat record; and
  generating the to-be-displayed chat record comprising the original historical chat record and the association information.

7. The method of claim 1, wherein displaying the to-be-displayed chat record in the display manner specified by the display manner control information comprises:
  obtaining a script by combining the display manner control information with the to-be-displayed chat record; and
  running the script.

8. The method of claim 1, further comprising setting the display effect control information of the specified content as a third preset display effect control information corresponding to a first specified user state when the attribute information of the specified content is a user state of a content sender, wherein the first specified user state is the user state of the content sender of the specified content when the specified content is generated.

9. A method for displaying a historical chat record, comprising:

determining a to-be-displayed chat record comprising attribute information, wherein the to-be-displayed chat record includes an original historical chat record;

obtaining, based on the attribute information, display manner control information for the to-be-displayed chat record by:

obtaining a generation time interval according to a first generation moment and a second generation moment of content in the original historical chat record of the to-be-displayed chat record;

comparing the generation time interval with at least one threshold time interval;

setting a display time interval of the to-be-displayed chat record to an interval value based on the comparison of the generation time interval with the at least one threshold time interval;

obtaining one or more attributes from the attribute information of the to-be-displayed chat record;

generating the display manner control information comprising display effect control information, wherein generating the display manner control information comprises setting the display time interval between a first display start moment of a first content and a second display start moment of a second content, and wherein the display manner control information comprises the display time interval;

displaying the to-be-displayed chat record in the display manner specified by the display manner control information comprising displaying specified content, wherein a display effect corresponds to the display effect control information; and setting the display effect control information of the specified content as a third preset display effect control information corresponding to a first specified user state when the attribute information of the specified content is a user state of a content sender, wherein the first specified user state is the user state of the content sender of the specified content when the specified content is generated; and subsequently displaying the to-be-displayed chat record in a successive manner specified by the display manner control information.

10. The method of claim 9, wherein setting the display effect control information of the specified content according to the attribute information of the specified content in the to-be-displayed chat record comprises setting the display effect control information of the specified content as a second preset display effect control information corresponding to a semantic feature of the specified content when the attribute information of the specified content is the semantic feature of the specified content.

11. The method of claim 9, wherein determining the to-be-displayed chat record comprises:

obtaining the original historical chat record by determining historical chat records that meet a pre-determined screening condition;

searching for association information associated with second attribute information of the original historical chat record; and generating the to-be-displayed chat record comprising the original historical chat record and the association information.

12. The method of claim 9, wherein displaying the to-be-displayed chat record in the display manner specified by the display manner control information comprises:

obtaining a script by combining the display manner control information with the to-be-displayed chat record; and running the script.

13. The method of claim 9, wherein obtaining the display manner control information comprises receiving the display manner control information based on the attribute information of the to-be-displayed chat record from a control information generation device.

14. The method of claim 9, wherein setting the display time interval between the display start moment of the first content and the display start moment of the second content comprises:

obtaining the generation time interval between a first generation moment of the first content and a second generation moment of the second content;

setting the display time interval to a first interval value when the generation time interval is greater than or equal to a first threshold time interval;

setting the display time interval to a second interval value when the generation time interval is less than the first threshold time interval and is greater than a second threshold time interval; and setting the display time interval to a third interval value when the generation time interval is less than or equal to the second threshold time interval, wherein the first threshold time interval is greater than the second threshold time interval, wherein the first interval value is greater than the second interval value, and wherein the second interval value is greater than the third interval value.

15. The method of claim 9, wherein obtaining the display manner control information comprises receiving the display manner control information based on the attribute information of the to-be-displayed chat record from a control information generation device.

16. The method of claim 9, wherein displaying the to-be-displayed chat record in the display manner specified by the display manner control information comprises:

obtaining a script by combining the display manner control information with the to-be-displayed chat record; and running the script.

17. A method for displaying a historical chat record, comprising:

determining a to-be-displayed chat record comprising attribute information, wherein the to-be-displayed chat record includes an original historical chat record;

obtaining, based on the attribute information, display manner control information for the to-be-displayed chat record, by:

obtaining a generation time interval according to a first generation moment and a second generation moment of content in the original historical chat record of the to-be-displayed chat record;

comparing the generation time interval with at least one threshold time interval;

setting a display time interval of the to-be-displayed chat record to an interval value based on the comparison of the generation time interval with the at least one threshold time interval;

obtaining one or more attributes from the attribute information of the to-be-displayed chat record;

generating the display manner control information comprising display effect control information, wherein generating the display manner control information comprises setting the display time interval between a first display start moment of a first content and a second display start moment of a second content, and wherein the display manner control information comprises the display time interval;

displaying the to-be-displayed chat record in the display manner specified by the display manner control information comprising displaying specified content, wherein a display effect corresponds to the display effect control information; and setting the display effect control information of the specified content as a fourth preset display effect control information corresponding to a second specified user state when the attribute information of the specified content is a user state of a content sender, wherein the second specified user state is the user state of the content sender of the specified content when the historical chat record is displayed; and subsequently displaying the to-be-displayed chat record in a successive manner specified by the display manner control information.

18. The method of claim 17, wherein setting the display effect control information of the specified content according to the attribute information of the specified content in the to-be-displayed chat record comprises setting the display effect control information of the specified content as a second preset display effect control information corresponding to a semantic feature of the specified content when the attribute information of the specified content is the semantic feature of the specified content.

19. The method of claim 17, wherein determining the to-be-displayed chat record comprises:
   obtaining the original historical chat record by determining historical chat records that meet a pre-determined screening condition;
   searching for association information associated with second attribute information of the original historical chat record; and
   generating the to-be-displayed chat record comprising the original historical chat record and the association information.

20. The method of claim 17, wherein displaying the to-be-displayed chat record in the display manner specified by the display manner control information comprises:
   obtaining a script by combining the display manner control information with the to-be-displayed chat record; and
   running the script.

21. The method of claim 17, wherein obtaining the display manner control information comprises receiving the display manner control information based on the attribute information of the to-be-displayed chat record from a control information generation device.

22. The method of claim 17, wherein displaying the to-be-displayed chat record in the display manner specified by the display manner control information comprises:
   obtaining a script by combining the display manner control information with the to-be-displayed chat record; and
   running the script.

* * * * *